US011677650B2

(12) United States Patent
Parla et al.

(10) Patent No.: US 11,677,650 B2
(45) Date of Patent: Jun. 13, 2023

(54) NETWORK FLOW ATTRIBUTION IN SERVICE MESH ENVIRONMENTS

(71) Applicant: Cisco Technology, Inc., San Jose, CA (US)

(72) Inventors: Vincent E. Parla, North Hampton, NH (US); Kyle Andrew Donald Mestery, Woodbury, MN (US); Andrew Zawadowskiy, Hollis, NH (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 17/487,100

(22) Filed: Sep. 28, 2021

(65) Prior Publication Data
US 2023/0099370 A1 Mar. 30, 2023

(51) Int. Cl.
*G06F 15/173* (2006.01)
*H04L 43/0882* (2022.01)
*H04L 43/0811* (2022.01)
*H04L 43/062* (2022.01)
*H04L 41/22* (2022.01)
*H04L 67/1023* (2022.01)
*H04L 67/1008* (2022.01)
*H04L 67/561* (2022.01)
*G06F 15/16* (2006.01)

(52) U.S. Cl.
CPC .......... *H04L 43/0882* (2013.01); *H04L 41/22* (2013.01); *H04L 43/062* (2013.01); *H04L 43/0811* (2013.01); *H04L 67/1008* (2013.01); *H04L 67/1023* (2013.01); *H04L 67/561* (2022.05)

(58) Field of Classification Search
CPC ... H04L 43/0882; H04L 41/22; H04L 43/062; H04L 43/0811; H04L 67/1008; H04L 67/1023; H04L 67/2804
USPC .......................................... 709/224
See application file for complete search history.

(56) References Cited

U.S. PATENT DOCUMENTS

| 2015/0033072 A1* | 1/2015 | Barr ..................... G06F 11/1484 714/15 |
| 2015/0120856 A1* | 4/2015 | Bennett ................. H04L 41/145 709/213 |

(Continued)

FOREIGN PATENT DOCUMENTS

WO WO-2020094664 A1 * 5/2020 ............... G06F 9/24

OTHER PUBLICATIONS

"AWS App Mesh User Guide", online: https://docs.aws.amazon.com/app-mesh/latest/userguide/what-is-app-mesh.html, accessed Jul. 5, 2021, 159 pages, Amazon Web Services, Inc.

(Continued)

*Primary Examiner* — Karen C Tang
(74) *Attorney, Agent, or Firm* — Behmke Innovation Group LLC; Kenneth J. Heywood; Jonathon P. Western (57) ABSTRACT

In one embodiment, a monitoring engine obtains mesh flow data for traffic flows between nodes in a service mesh. The monitoring engine associates the mesh flow data with network traffic between an endpoint device and an edge of the service mesh. The monitoring engine identifies, based on the mesh flow data, a particular container workload associated with the traffic flows. The monitoring engine provides an indication that the particular container workload is associated with the network traffic between the endpoint device and the edge of the service mesh.

18 Claims, 6 Drawing Sheets

(56) References Cited

U.S. PATENT DOCUMENTS

| | | | |
|---|---|---|---|
| 2016/0359872 A1* | 12/2016 | Yadav | H04L 63/1408 |
| 2018/0176102 A1* | 6/2018 | Bansal | H04L 63/0263 |
| 2018/0176252 A1* | 6/2018 | Nimmagadda | H04L 63/0263 |
| 2018/0309788 A1* | 10/2018 | Johnson | H04L 63/10 |
| 2018/0309790 A1* | 10/2018 | Johnson | H04L 63/20 |
| 2019/0230035 A1 | 7/2019 | Rao et al. | |
| 2019/0312841 A1 | 10/2019 | Moses et al. | |
| 2020/0106741 A1 | 4/2020 | Fandli | |
| 2020/0145376 A1* | 5/2020 | Pope | H04L 63/029 |
| 2020/0177485 A1* | 6/2020 | Shurtleff | H04L 43/08 |
| 2021/0029166 A1* | 1/2021 | Krishna | H04L 63/0263 |
| 2021/0224179 A1* | 7/2021 | Gunda | G06F 9/45558 |
| 2021/0243091 A1* | 8/2021 | Raney | H04L 43/04 |

OTHER PUBLICATIONS

Hillegass, et al., "Cloud Native Security Whitepaper", online: https://github.com/cncf/tag-security/commits/main/security-whitepaper/cloud-native-security-whitepaper.md, Nov. 18, 2020, 47 pages, Github.com.

"Cloud Monitoring, Full Prometheus Compatibility | Sysdig", online: https://sysdig.com/products/monitor/, accessed Sep. 8, 2021, 15 pages, Sysdig, Inc.

"Express Data Path", online: https://en.wikipedia.org/wiki/Express_Data_Path, Aug. 4, 2021, 2 pages, Wikimedia Foundation, Inc.

Chaignon, et al., "GitHub—cilium/cilium: eBPF-based Networking, Security, and Observability", online: https://github.com/cilium/cilium, accessed Sep. 8, 2021, 6 pages, Github.com.

"Service Mesh", online: https://en.wikipedia.org/wiki/Service_mesh, Sep. 2, 2021, 1 page, Wikimedia Foundation, Inc.

Klein, Matt, "Service mesh data plane vs. control plane", online: https://blog.envoyproxy.io/service-mesh-data-plane-vs-control-plane-2774e720f7fc, Oct. 10, 2017, 7 pages, Envoy Proxy.

Narumoto, et al., "Sidecar pattern", online: https://docs.microsoft.com/en-us/azure/architecture/patterns/sidecar, Jun. 23, 2017, 4 pages, Microsoft.com.

"What is Service Mesh?", online: https://www.redhat.com/en/topics/microservices/what-is-a-service-mesh, accessed Sep. 8, 2021, 6 pages, Red Hat, Inc.

"X-Forwarded-For", online: https://developer.mozilla.org/en-US/docs/Web/HTTP/Headers/X-Forwarded-For, Aug. 13, 2021, 3 pages, MDN Web Docs Moz://a.

Parla, Vinny, "An introduction to the new Cisco Network Visibility Flow Protocol (nvzFlow)", online: https://blogs.cisco.com/security/an-introduction-to-the-new-cisco-network-visibility-flow-protocol-nvzflow, Nov. 16, 2015, 9 pages, Cisco Blogs.

"Berkeley Packet Filter", online: https://en.wikipedia.org/wiki/Berkeley_Packet_Filter, Aug. 31, 2021, 4 pages, Wikimedia Foundation, Inc.

\* cited by examiner

NETWORK FLOW ATTRIBUTION IN SERVICE MESH ENVIRONMENTS

TECHNICAL FIELD

The present disclosure relates generally to computer systems, and, more particularly, to network flow attribution in cloud native environments.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, service meshes have arisen in recent years as a core component of cloud-native solutions to support communications between (micro)services using a proxy mechanism. While this approach can provide certain benefits such as automating retries, managing backoffs for failed requests, and the like, the added complexity of service meshes also makes it quite challenging to perform end-to-end flow attribution back to a specific workload in the service mesh. In general, cloud-native ecosystems may include containers, service meshes, virtual machines, Kubernetes pods, Lambda functions and a number of other workload components that comprise the entire solution

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a monitoring engine obtains mesh flow data for traffic flows between nodes in a service mesh. The monitoring engine associates the mesh flow data with network traffic between an endpoint device and an edge of the service mesh. The monitoring engine identifies, based on the mesh flow data, a particular container workload associated with the traffic flows. The monitoring engine provides an indication that the particular container workload is associated with the network traffic between the endpoint device and the edge of the service mesh.

Other embodiments are described below and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
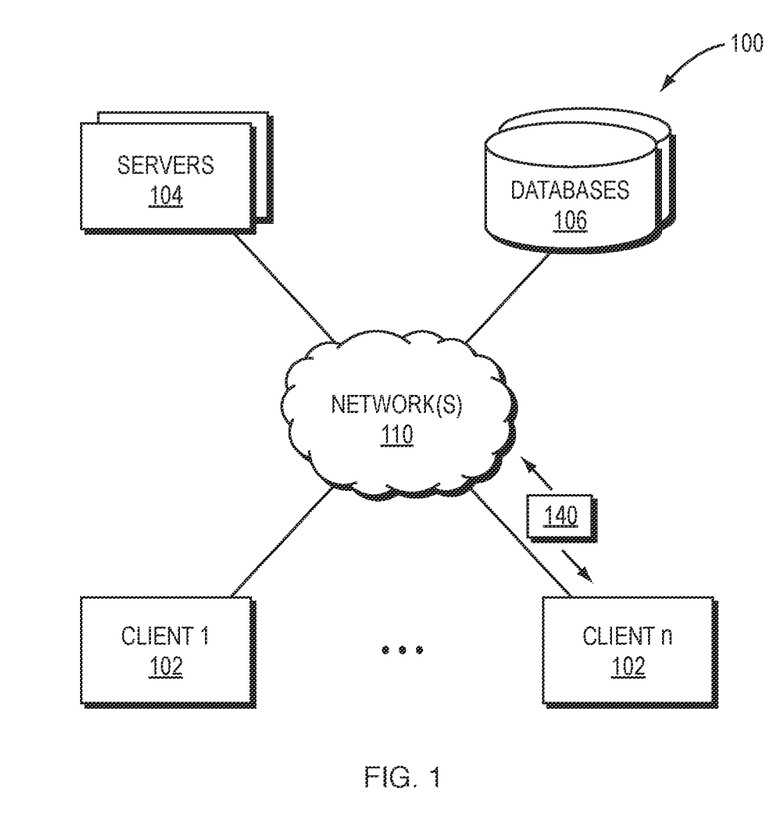
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
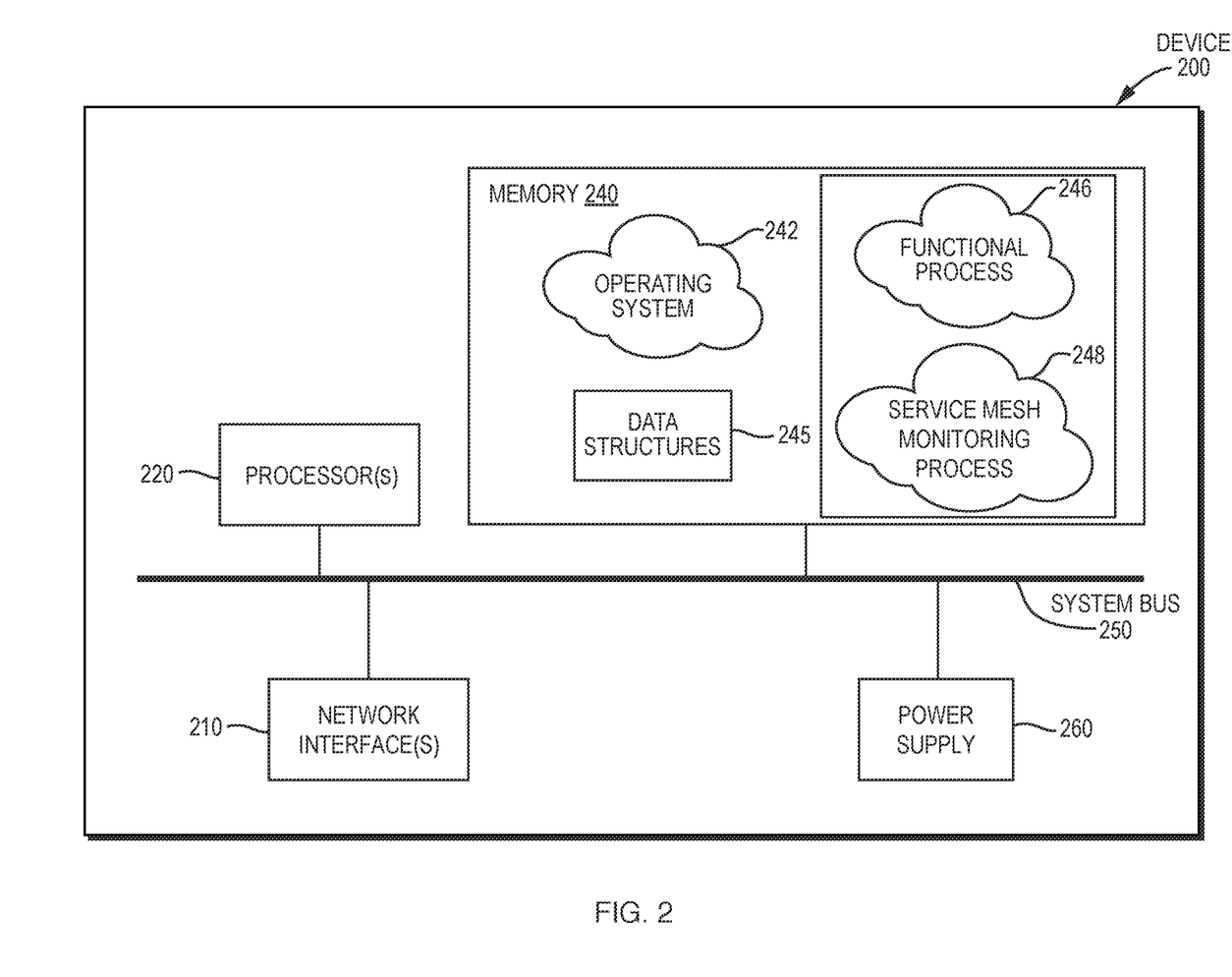
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative service mesh monitoring process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Observability Intelligence Platform

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems or identifying potential or active security threats can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
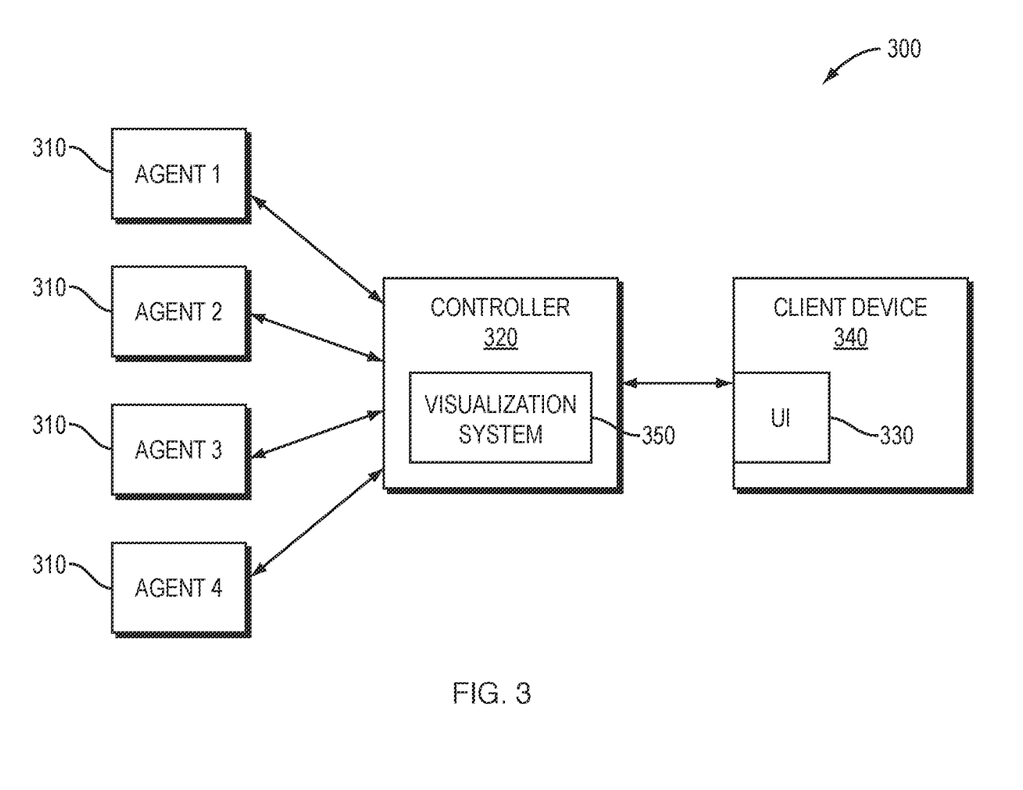
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of a controller 320 may be hosted remotely by a provider of the observability intelligence platform 300. In an illustrative on-premises (On-Prem) implementation, an instance of a controller 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

Network Flow Attribution in Service Mesh Environments

As noted above, container and workload monitoring is becoming increasingly important in a cloud-native environment. Indeed, solutions such as Envoy, Linkerd, Istio, and the like, are frameworks for realizing a service mesh architecture at scale. However, despite the increasing popularity of service meshes, there are no built-in mechanisms for observing the originating process (software) creating a flow from the perspective of the outbound or inbound traffic for the service mesh. In other words, despite the popularity of service mesh frameworks, these frameworks still lack mechanisms to cross-correlate traffic between their proxy and mesh interfaces in a way that provides end-to-end observability.

The techniques herein, therefore, introduce mechanisms for use with a service mesh that provide an authoritative view of an end-to-end flow and attribute it back to the specific workload in the service mesh associated with that flow. In some aspects, the techniques herein may do so by running byte code monitors on each node in the service mesh, to collect data/artifacts associated with that segment of the flow and, potentially, any workload context that is of value. In turn, the flow fragments are then 'stitched' together, along with the contextual artifacts, to form an end-to-end view of the flow.

Specifically, according to one or more embodiments described herein, a monitoring engine obtains mesh flow data for traffic flows between nodes in a service mesh. The monitoring engine associates the mesh flow data with network traffic between an endpoint device and an edge of the service mesh. The monitoring engine identifies, based on the mesh flow data, a particular container workload associated with the traffic flows. The monitoring engine provides an indication that the particular container workload is associated with the network traffic between the endpoint device and the edge of the service mesh.

Operationally, a typical service mesh includes a plurality of container workloads that execute different (micro)services of an online application. A key defining feature of a service mesh is the use of side-car proxies, each of which is executed alongside a corresponding containerized workload. These side-car proxies are communicatively linked together, to form the service mesh.

As would be appreciated, a side-car proxy may be responsible for any or all of the following actions, among others:
Discovering services/container workloads
Routing requests to a service instance
Authentication and authorization
Etc.

In other words, the side-car proxies in a service mesh function together as part of a data plane that controls the flow of traffic among the services/container workloads in the mesh. A service mesh also typically implements a control plane that is responsible for scheduling services, configuring side-car proxies, and managing other configurations in the service mesh.

Another component of a service mesh is typically a load balancer/proxy at the edge of the mesh that is responsible for handling incoming and outgoing traffic to and from the mesh. More specifically, the edge proxy may be responsible for scheduling workloads, performing load balancing, and other functions.

Figure 4:
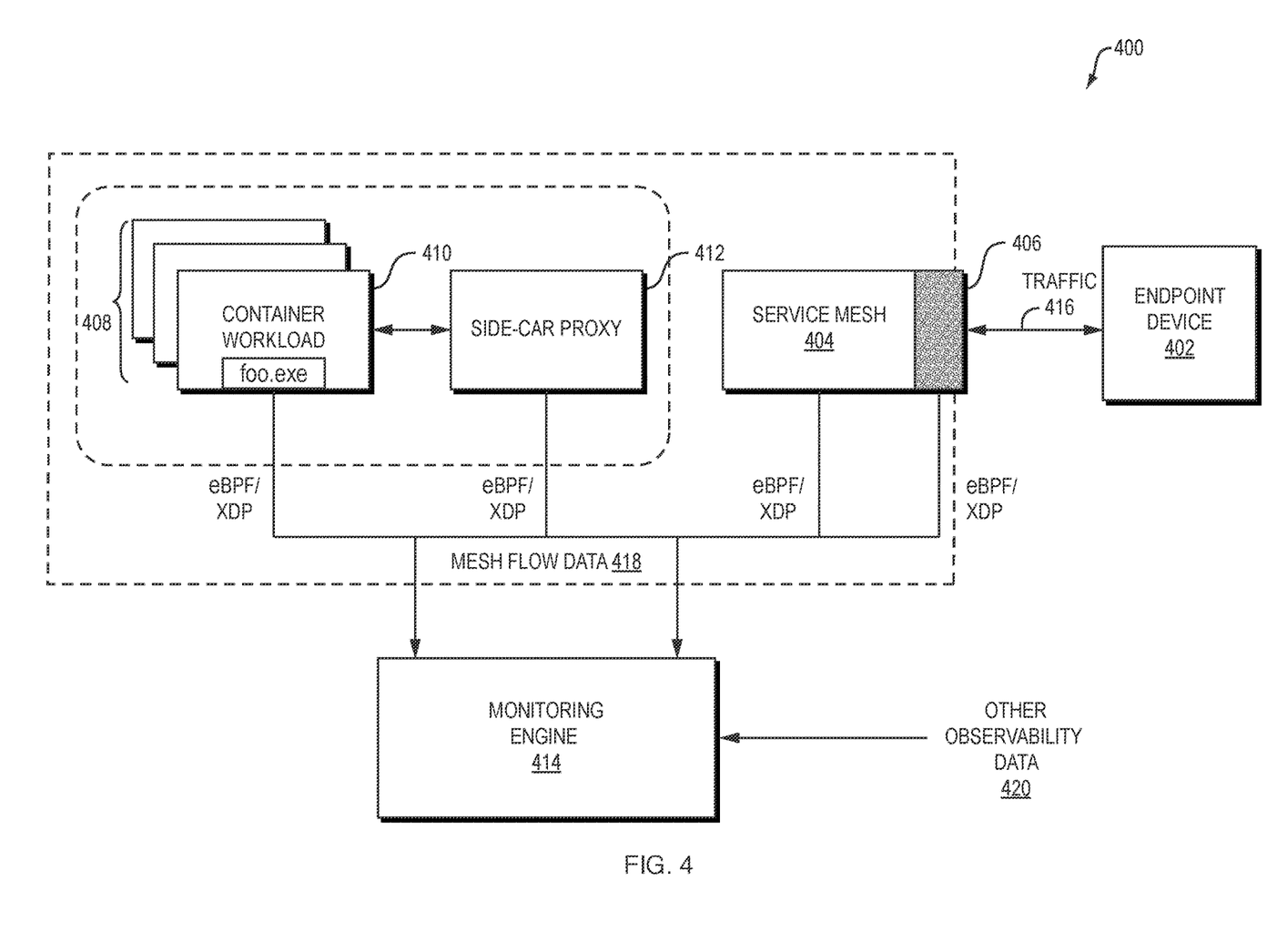
FIG. 4 illustrates a simplified example of the monitoring of a service mesh.

FIG. 4 illustrates a simplified example 400 of the monitoring of a service mesh, according to various embodiments. As shown, assume that there is a service mesh 404 that comprises any number of container workloads 408, each of which may have an associated side-car proxy. For instance, one particular container workload 410 may execute foo.exe and have an associated side-car proxy 412.

At the edge of service mesh 404 may be an (ingress) load balancer/proxy 406 that is responsible for handling any incoming requests (e.g., via an external network) and/or passing any resulting traffic back to external clients. For instance, assume that there is an endpoint device 402 that sends a request to service mesh 404 for the execution of foo.exe (e.g., as part of traffic 416 exchanged between service mesh 404 and endpoint device 402 via a network that is external to service mesh 404). In such a case, load balancer/proxy 406 may identify container workload 410 from among container workloads 408 as being responsible for handling the request from endpoint device 402.

Rather than sending the request directly to the particular container workload 410, load balancer/proxy 406 may send the request through service mesh 404 to side-car proxy 412, which passes the request to the particular container workload 410. In turn, one particular container workload 410 may perform the requested operation and produce an output.

Routing of the output of one particular container workload 410 back to endpoint device 402 may proceed in much the same way as the forwarding of the initial request to one particular container workload 410. Namely, the particular container workload 410 may pass its output response to its associated side-car proxy 412, which routes the response through service mesh 404 back to proxy 406 at the edge of service mesh 404. From there, proxy 406 sends the output response onward to endpoint device 402 via an external network connection.

As noted, a key issue today in service meshes is the lack of end-to-end observability. In other words, even with the rudimentary observability mechanisms available today for service meshes, there are currently no mechanisms in place that link an incoming request to a service mesh with the particular container workload that handled the request. For instance, in FIG. 4, there would be no way to attribute traffic 416 to the particular container workload 410 that handled the request sent by endpoint device 402.

According to various embodiments, the techniques herein propose the addition of a monitoring engine 414 that is responsible for correlating network traffic with its responsible container workload in container workloads 408. Thus, monitoring engine 414 may determine that traffic 416 from the external network is related to the particular container workload 410. In turn, monitoring engine 414 may provide an indication of this, such as for display to a network administrator or other user. In another embodiment, the information compiled by monitoring engine 414 could also be used to ensure policy compliance, such as by comparing the intents of the various components to ensure that they comply with a defined policy. This could be useful for purposes of identifying security threats, such as command and control (CNC) channels used by malware, etc.

Monitoring engine 414 may take the form of one or more devices that execute specialized instructions, such as service mesh monitoring process 248. Such instructions may be executed entirely on a single device (e.g., a device 200) or in a distributed manner, in which case the set of executing devices may be seen as a single executing device for purposes of the teachings herein.

To bind the traffic flows on both sides of service mesh 404 to the particular container workload 410 in an authoritative manner, various data collection mechanisms are proposed herein. In various embodiments, as shown, the techniques herein propose collecting mesh flow data from the various nodes in service mesh 404, such as container workloads 408, their associated side-car proxies, such as side-car proxy 412, and/or load balancer/proxy 406 at the edge of service mesh 404.

In some embodiments, monitoring engine 414 may obtain mesh flow data 418 from the various nodes of service mesh 404 by leveraging Extended Berkeley Packet Filter (eBPF) or eXpress Data Path (XDP) information collected at each node using bytecode monitors/agents. This information can then be stitched together to form a complete view of the flow of traffic across service mesh 404. In some embodiments, the actual process responsible for the traffic flow may be annotated in the resulting flow record, allowing the records for the various segments to be stitched together along with their associated rich workload/process-context responsible for initiation of the flow on the inside of the proxy connection. In further embodiments, monitoring engine 414 may also obtain and use other observability data 420, such as Netflow records or the like, as part of its assessment.

In other embodiments, mesh flow data 418 may take the form of per node metadata that can be stitched together inline using protocol encapsulation such as Generic UDP Encapsulation (GUE), Generic Routing Encapsulation (GRE), Generic Network Virtualization Encapsulation (GENEVE), an IPv6 optional header, or the like, in addition to the out of band technique shown in FIG. 4.

Figure 5:
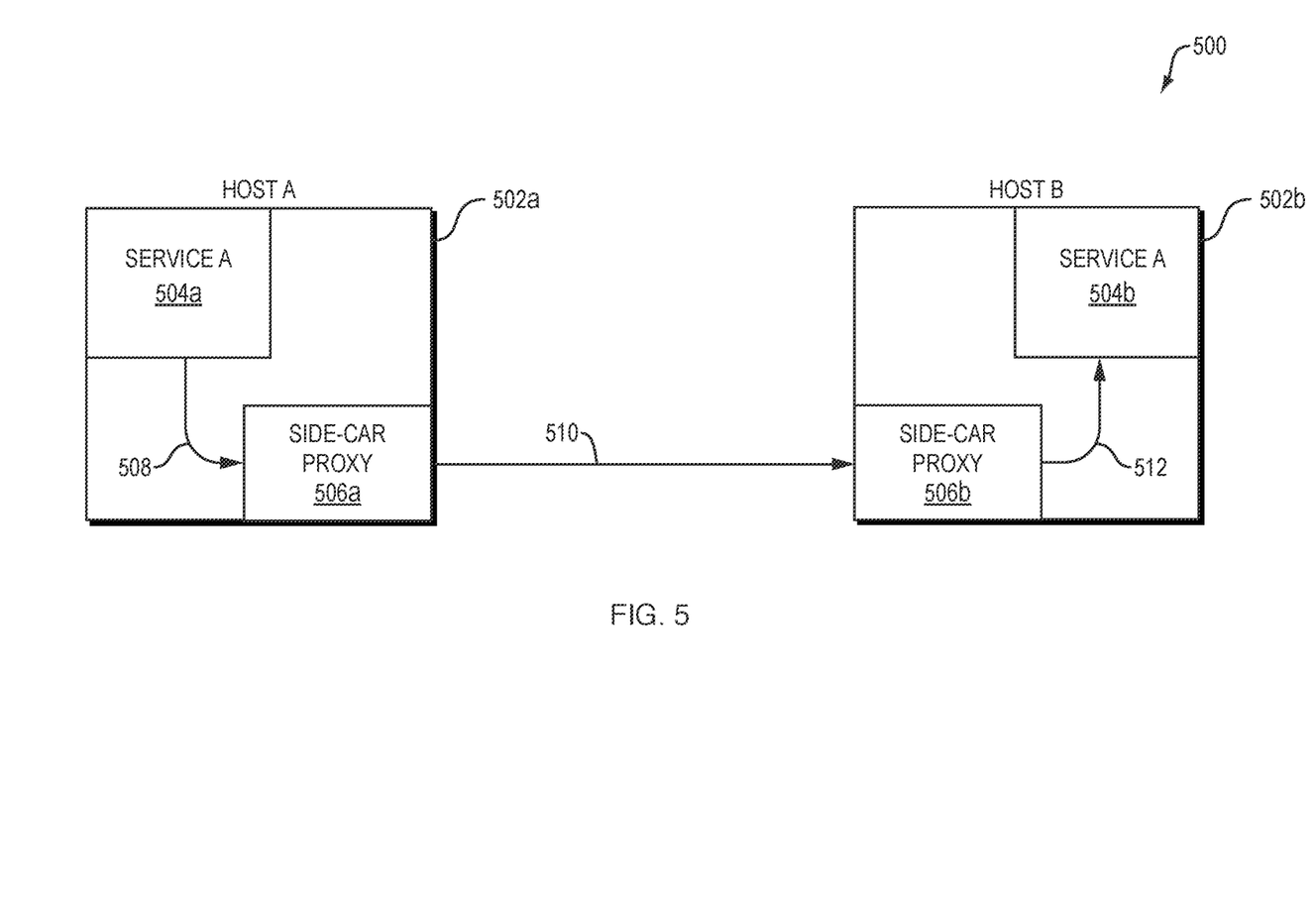
FIG. 5 illustrates an example of the flow of traffic within a service mesh.

FIG. 5 illustrates a more detailed example 500 of the flow of traffic within a service mesh, such as service mesh 404 in FIG. 4, according to various embodiments. As shown, assume that there are two hosts 502a-502b in the service mesh, denoted "Host A" and "Host B" in FIG. 5. Each of these hosts may host a separate container workload/service 504a-504b, respectively, which are denoted "Service A" and "Service B." In addition, Host A may also host side-car proxy 506a for Service A and Host B may host side-car proxy 506b for its Service B.

Consider now the case in which Service A needs to communicate with Service B (e.g., by sending data to Service B for processing). In a service mesh architecture, this does not happen directly, but requires sending the traffic through the intermediary side-car proxies 506a-506b. Thus, three connections are required to perform this communication: a first connection 508 from Service A to its side-car proxy 506a, a second connection from side-car proxy 506a to side-car proxy 506b, and a third connection from side-car proxy 506b to Service B.

Using the techniques herein, mesh flow data 418 may be collected regarding each of connections 508-512. For instance, connection 508 may be recorded as follows:

{Src: $IP_A$, port, pid; Dst: $IP_A$, port, pid, Protocol} where "pid" is the process identifier for Service A.

Likewise, connection 510 may be represented as follows:

{Src: $IP_A$, port, pid; Dst: $IP_B$, port, Protocol}

Finally, connection 512 may be represented as follows:

{Src: $IP_B$, port, pid; Dst: $IP_B$, port, Protocol}

Stitching of the above records can be achieved either as a two step or three step operation, in various embodiments. For instance, a two step join could be performed as follows, if all three legs are reported by each side-car proxy as independent flows:

Flow AB=(connection 508 JOIN connection 510) JOIN connection 512

Similarly, a three step stitching operation is possible if each side-car proxy or other component stitches flows (e.g., local and remote) at the time of completion, locally. These flows may then be stitched one more time by monitoring engine 414, to produce the final, end-to-end flow:

Flow AB=(connection 508 JOIN connection 510) JOIN (connection 510 JOIN connection 512)

Regardless of the stitching operation selected, the end result is an end-to-end view of the flow between Service A and Service B in the service mesh.

Figure 6:
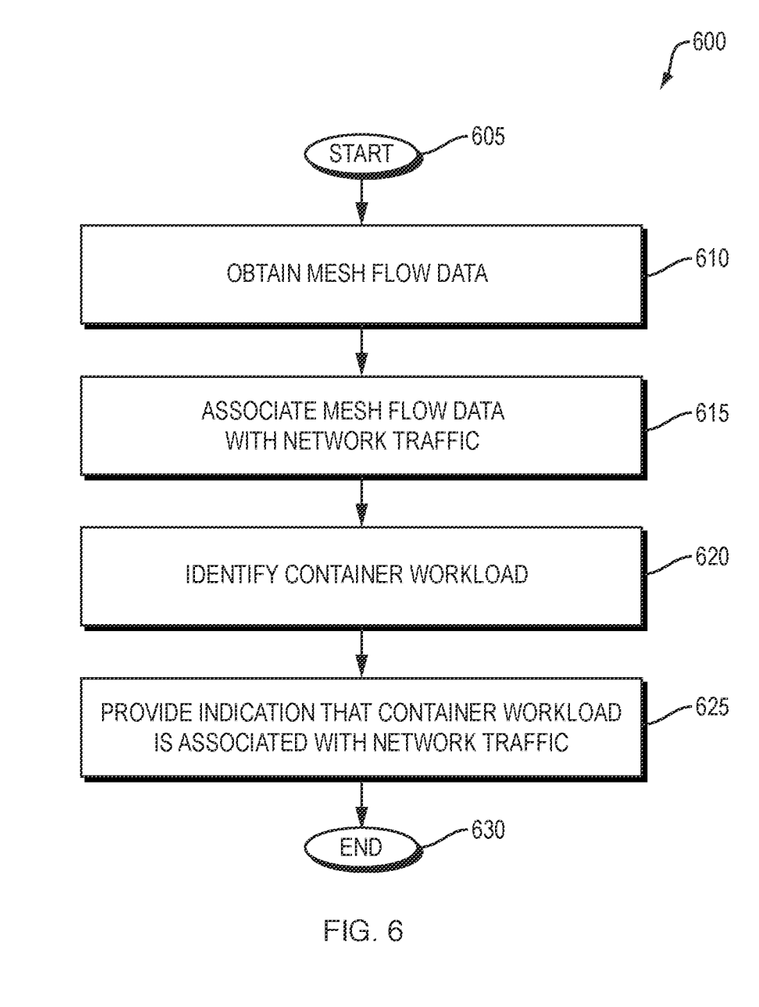
FIG. 6 illustrates an example simplified procedure for performing flow attribution in a service mesh, in accordance with one or more embodiments described herein.

In closing, FIG. 6 illustrates an example simplified procedure for performing flow attribution in a service mesh, in accordance with one or more embodiments described herein. For example, a non-generic, specifically configured device (e.g., device 200) may perform procedure 600 by executing stored instructions (e.g., illustrative service mesh monitoring process 248), to function as a monitoring engine for a service mesh. The procedure 600 may start at step 605, and continues to step 610, where, as described in greater detail above, the monitoring engine may obtain mesh flow data for traffic flows between nodes in a service mesh. In various embodiments, such nodes may include a load balancer or proxy at the edge of the service mesh, various container workloads in the service mesh, various side-car proxies for the container workloads, or the like. In various embodiments, the mesh flow data may take the form of eBPF data, XDP data, protocol encapsulation or IPv6 optional header data, or the like.

At step 615, as detailed above, the monitoring engine may associate the mesh flow data with network traffic between an endpoint device and an edge of the service mesh. For instance, the monitoring engine may associate the mesh flow data with telemetry data collected from a network that connects the endpoint device and the edge of the service network. In various embodiments, the monitoring engine may also stitch together the mesh flow data, to form an authoritative view of the traffic within the service mesh.

At step 620, the monitoring engine may identify, based on the mesh flow data, a particular container workload associated with the traffic flows, as described in greater detail above. For instance, by stitching the mesh flow data together from the various nodes, the monitoring engine may determine that the particular container workload was responsible for the traffic flows in the service mesh, such as by sending data to other container workloads or side-car proxies, etc. Doing so also allows the monitoring engine to identify the container workload responsible for sending traffic through the service mesh and ultimately to the endpoint device.

At step 625, as detailed above, the monitoring engine may provide an indication that the particular container workload is associated with the network traffic between the endpoint device and the edge of the service mesh. For instance, the monitoring engine may provide the indication for display to a user. In further embodiments, the monitoring engine may provide the indication for a security or other policy assessment, to ensure that the traffic flows in the service mesh comply with one or more defined policies.

The simplified procedure 600 may then end in step 630, notably with the ability to continue ingesting and processing data.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for network flow attribution in service mesh environments. In particular, the techniques herein allow for end-to-end observability of traffic flows as they traverse a service mesh. In addition, the techniques herein allow for the identification of the endpoint container workflow responsible for the traffic flows.

Illustratively, the techniques described herein may be performed by hardware, software, and/or firmware, such as in accordance with the illustrative service mesh monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, a method herein may comprise obtaining, by a monitoring engine, mesh flow data for traffic flows between nodes in a service mesh; associating, by the monitoring engine, the mesh flow data with network traffic between an endpoint device and an edge of the service mesh; identifying, by the monitoring engine and based on the mesh flow data, a particular container workload associated with the traffic flows; and providing, by the monitoring engine, an indication that the particular container workload is associated with the network traffic between the endpoint device and the edge of the service mesh.

In one embodiment, the nodes in the service mesh comprise container workloads and side-car proxies. In another embodiment, obtaining the mesh flow data comprises receiving mesh flow data from a load balancer or proxy at the edge of the service mesh. In an additional embodiment, obtaining the mesh flow data comprises receiving mesh flow data from the particular container workload and one or more other container workloads in the service mesh. In a further embodiment, obtaining the mesh flow data comprises receiving mesh flow data from a side-car proxy for the particular container workload. In another embodiment, the mesh flow data comprises Extended Berkeley Packet Filter (eBPF) data. In a further embodiment, the mesh flow data comprises eXpress Data Path (XDP) data. In yet another embodiment, the mesh flow data comprises protocol encapsulation header data or IPv6 optional header data. In a further embodiment, associating the mesh flow data with network traffic between an endpoint device and an edge of the service mesh comprises associating the mesh flow data with telemetry data collected from a network that connects the endpoint device and the edge of the service mesh. In another embodiment, providing the indication that the particular container workload is associated with the network traffic between the endpoint device and the edge of the service mesh comprises providing the indication for display to a user.

According to the embodiments herein, a tangible, non-transitory, computer-readable medium herein may have computer-executable instructions stored thereon that cause a device to perform a process comprising: obtaining mesh flow data for traffic flows between nodes in a service mesh; associating the mesh flow data with network traffic between an endpoint device and an edge of the service mesh; identifying, based on the mesh flow data, a particular container workload associated with the traffic flows; and providing an indication that the particular container workload is associated with the network traffic between the endpoint device and the edge of the service mesh.

Further, according to the embodiments herein an apparatus herein may comprise: a network interface to communicate with a computer network; a processor coupled to the network interface and configured to execute one or more processes; and a memory configured to store a process that is executable by the processor, the process, when executed, configured to: obtain mesh flow data for traffic flows between nodes in a service mesh; associate the mesh flow data with network traffic between an endpoint device and an edge of the service mesh; identify, based on the mesh flow data, a particular container workload associated with the traffic flows; and provide an indication that the particular container workload is associated with the network traffic between the endpoint device and the edge of the service mesh.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. In addition, while the techniques herein have been described primarily with respect to end-to-end observability in service meshes, the techniques herein could equally be used for purposes of end-to-end flow attribution in a container or Kubernetes environment, even without a service mesh. The techniques could further be used to work with functions such as a Lambda service in terms of flow aggregation.

Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   obtaining, by a monitoring engine, mesh flow data for traffic flows between nodes in a service mesh comprising a plurality of container workloads and a plurality of side-car proxies, each of which is executed alongside a corresponding container workload of the plurality of container workloads;
   associating, by the monitoring engine, the mesh flow data with network traffic between an endpoint device and an edge of the service mesh;
   identifying, by the monitoring engine and based on the mesh flow data, a particular container workload associated with the traffic flows among the plurality of container workloads; and
   providing, by the monitoring engine, an indication that the particular container workload is associated with the network traffic between the endpoint device and the edge of the service mesh.

2. The method as in claim 1, wherein obtaining the mesh flow data comprises:
   receiving mesh flow data from a load balancer or proxy at the edge of the service mesh.

3. The method as in claim 1, wherein obtaining the mesh flow data comprises:
   receiving mesh flow data from the particular container workload and one or more other container workloads of the plurality of container workloads in the service mesh.

4. The method as in claim 1, wherein obtaining the mesh flow data comprises:
   receiving mesh flow data from a side-car proxy of the plurality of side-car proxies for the particular container workload.

5. The method as in claim 1, wherein the mesh flow data comprises Extended Berkeley Packet Filter (eBPF) data.

6. The method as in claim 1, wherein the mesh flow data comprises eXpress Data Path (XDP) data.

7. The method as in claim 1 wherein the mesh flow data comprises protocol encapsulation header data or IPv6 optional header data.

8. The method as in claim 1, wherein associating the mesh flow data with network traffic between an endpoint device and an edge of the service mesh comprises:
   associating the mesh flow data with telemetry data collected from a network that connects the endpoint device and the edge of the service mesh.

9. The method as in claim 1, wherein providing the indication that the particular container workload is associated with the network traffic between the endpoint device and the edge of the service mesh comprises:
   providing the indication for display to a user.

10. An apparatus, comprising:
    a network interface to communicate with a computer network;
    a processor coupled to the network interface and configured to execute one or more processes; and
    a memory configured to store a process that is executed by the processor, the process when executed configured to:
    obtain mesh flow data for traffic flows between nodes in a service mesh comprising a plurality of container workloads and a plurality of side-car proxies, each of which is executed alongside a corresponding container workload of the plurality of container workloads;

associate the mesh flow data with network traffic between an endpoint device and an edge of the service mesh;

identify, based on the mesh flow data, a particular container workload associated with the traffic flows among the plurality of container workloads; and provide an indication that the particular container workload is associated with the network traffic between the endpoint device and the edge of the service mesh.

11. The apparatus as in claim 10, wherein the apparatus obtains the mesh flow data by:

receiving mesh flow data from a load balancer or proxy at the edge of the service mesh.

12. The apparatus as in claim 10, wherein the apparatus obtains the mesh flow data by:

receiving mesh flow data from the particular container workload and one or more other container workloads of the plurality of container workloads in the service mesh.

13. The apparatus as in claim 10, wherein the apparatus obtains the mesh flow data by:

receiving mesh flow data from a proxy side-car of the plurality of side-car proxies for the particular container workload.

14. The apparatus as in claim 10, wherein the mesh flow data comprises Extended Berkeley Packet Filter (eBPF) data.

15. The apparatus as in claim 10, wherein the mesh flow data comprises eXpress Data Path (XDP) data.

16. The apparatus as in claim 10 wherein the mesh flow data comprises protocol encapsulation header data or IPv6 optional header data.

17. The apparatus as in claim 10, wherein associating the mesh flow data with network traffic between an endpoint device and an edge of the service mesh comprises:

associating the mesh flow data with telemetry data collected from a network that connects the endpoint device and the edge of the service mesh.

18. A tangible, non-transitory, computer-readable medium storing program instructions that cause a device to execute a process comprising:

obtaining mesh flow data for traffic flows between nodes in a service mesh comprising a plurality of container workloads and a plurality of side-car proxies, each of which is executed alongside a corresponding container workload of the plurality of container workloads;

associating the mesh flow data with network traffic between an endpoint device and an edge of the service mesh;

identifying, based on the mesh flow data, a particular container workload associated with the traffic flows among the plurality of container workloads; and providing an indication that the particular container workload is associated with the network traffic between the endpoint device and the edge of the service mesh.

* * * * *

UNITED STATES PATENT AND TRADEMARK OFFICE
CERTIFICATE OF CORRECTION

| | | |
|---|---|---|
| PATENT NO. | : 11,677,650 B2 | Page 1 of 1 |
| APPLICATION NO. | : 17/487100 | |
| DATED | : June 13, 2023 | |
| INVENTOR(S) | : Vincent E. Parla | |

It is certified that error appears in the above-identified patent and that said Letters Patent is hereby corrected as shown below:

In the Specification

Column 8, Line 25, please amend as shown:
transaction is a type of user-initiated action in the monitored Signed and Sealed this
Twelfth Day of September, 2023

*Katherine Kelly Vidal*

Katherine Kelly Vidal
*Director of the United States Patent and Trademark Office*